(12) United States Patent
Bartel et al.

(10) Patent No.: US 8,240,420 B1
(45) Date of Patent: Aug. 14, 2012

(54) STEERING MECHANISM

(75) Inventors: Harlan J. Bartel, Newton, KS (US);
Brian R. Funk, Lehigh, KS (US)

(73) Assignee: Excel Industries, Inc., Hesston, KS (US)

( * ) Notice: Subject to any disclaimer, the term of this patent is extended or adjusted under 35 U.S.C. 154(b) by 366 days.

(21) Appl. No.: 12/586,411

(22) Filed: Sep. 22, 2009

Related U.S. Application Data

(60) Provisional application No. 61/197,199, filed on Oct. 23, 2008.

(51) Int. Cl.
*B60K 26/00* (2006.01)
(52) U.S. Cl. ........................................ 180/315
(58) Field of Classification Search .................. 180/315; 56/11.3, 10.8; 74/543, 546; 403/104
See application file for complete search history.

(56) References Cited

U.S. PATENT DOCUMENTS

| | | |
|---|---|---|
| 3,702,051 A | 11/1972 | Deines |
| 5,496,226 A | 3/1996 | Splittstoesser et al. |
| 5,502,957 A | 4/1996 | Robertson |
| 5,894,714 A | 4/1999 | Braun et al. |
| 5,913,802 A | 6/1999 | Mullet et al. |
| 5,946,894 A | 9/1999 | Eavenson et al. |
| 6,056,074 A | 5/2000 | Heal et al. |
| 6,301,864 B1 | 10/2001 | Damie et al. |
| 6,343,668 B1 | 2/2002 | Dean |
| 6,434,917 B1 | 8/2002 | Bartel |
| 6,729,115 B2 | 5/2004 | Bartel |
| 7,677,371 B2 * | 3/2010 | Dong et al. .................. 188/350 |
| 2006/0060019 A1 * | 3/2006 | Sato et al. .................. 74/473.23 |
| 2006/0128489 A1 * | 6/2006 | Mooney et al. .............. 473/139 |

OTHER PUBLICATIONS

Hustler Z Parts Manual, published by Hustler Turf Equipment of Hesston, KS, Jun. 2006, front cover, pp. 4-6 and 4-7.

* cited by examiner

*Primary Examiner* — Faye M. Fleming

(57) ABSTRACT

A steering lever mechanism for a mower vehicle includes a lever assembly and a base which is fixed to the mower vehicle for mounting the lever assembly to the mower. The lever assembly includes a pivot assembly and a lever portion. The lever portion is pivotably mounted to the pivot assembly for rotation about a longitudinal axis between an inboard position and an outboard position. The pivot assembly is also pivotably mounted to the base for rotation of the pivot bracket portion and the lever portion about a transverse axis between a rear position, an intermediate neutral position and a forward position. A rotation measuring device is associated with the base and the pivot assembly for measuring the forward and rear rotation of the lever assembly. A sensor for activating parking breaks is also associated with the base for sensing the lever assembly when it is in the outboard position.

5 Claims, 4 Drawing Sheets

STEERING MECHANISM

This application claims the benefit of U.S. Provisional Patent Application No. 61/197,199 filed Oct. 23, 2008.

FIELD

The present invention relates to a steering lever mechanism for a zero turn electric riding lawn mower.

BACKGROUND

Zero turn electric lawn mowers have been known in the art for several years. An example combined steering and brake control lever mechanism is taught by U.S. Pat. No. 6,729,115 issued to Bartel. The applicant's incorporate U.S. Pat. No. 6,729,115 herein as if repeated verbatim hereinafter. U.S. Pat. No. 6,729,115 teaches a mechanism which includes left and right steering levers. In the arrangement taught in U.S. Pat. No. 6,729,115 each of the steering levers independently control hydraulic valves which in turn control the flow of hydraulic fluid to one of either the left or right hydraulic drive wheel motors. Thus, in the steering control system taught in U.S. Pat. No. 6,729,115, if the operator pushes the right steering lever forward of the neutral position, the right drive wheel will rotate in a forward direction and if the operator pulls the right steering lever back from the neutral position, the right drive wheel will rotate in a reverse direction. The same is true for the left steering lever. Moreover, in the arrangement taught in U.S. Pat. No. 6,729,115, each steering lever may be pushed outboard when it is in the neutral position and if the operator pushes a steering lever outboard from the neutral position, a linkage is actuated to engage a parking brake associated with the wheel on the same side of the mower. The driving feel of the hydraulic based arrangement described in U.S. Pat. No. 6,729,115 has been well received by operators. The hydraulic valves of the arrangement described in U.S. Pat. No. 6,729,115 provide feedback resistance in response to steering lever movements. Also, in the arrangement taught in U.S. Pat. No. 6,729,115 the outward movement of a steering handle from the neutral position to engage a parking brake moves linkage members in a parking break linkage which in turn provides mechanical resistance to the outward movement of the handle. If an electric steering interface is selected for accomplishing the general functions of the arrangement taught by U.S. Pat. No. 6,729,115, then the problem of providing feedback through the steering handles to the operator arises. What is needed is an electric zero turn radius (ZTR) steering and brake interface which provides substantially the same feel as the arrangement taught in U.S. Pat. No. 6,729,115.

BRIEF DESCRIPTION OF THE INVENTION

The present invention answers this need by providing steering lever mechanism which includes a lever assembly and a base including at least one bracket fixed to the frame of the mower vehicle for mounting the lever assembly to a mower vehicle. The lever assembly includes a pivot assembly and a lever portion. The pivot assembly is pivotably mounted to the base for rotation of the pivot assembly and the lever portion about a transverse axis between a rear position, an intermediate neutral position and a forward position. A position measuring device is associated with the base and the pivot assembly for measuring the forward and rear rotation of the lever assembly. A mechanical resistance device connects between pivot assembly and the frame of the mower vehicle for resisting rotation of the pivot assembly and by extension the lever assembly between the forward position and the rear position. The lever portion is also pivotably mounted to the pivot assembly for rotation about a longitudinal axis between an inboard position and an outboard position. A sensor for activating a parking breaks is also associated with the base for sensing the lever portion when it is in the outboard position. A cam member is fixed to the lever portion and has first and second recesses. A cam follower is pivotably mounted to the pivot assembly and is spring biased for engaging one of the first or second recesses of the cam member. The cam follower and the cam member are arranged such that the cam follower is urged into the first recess when the lever portion is in the inboard position and such that the cam follower is urged into the second recess when the lever portion is in the outboard position. At least one of the brackets of the base includes a slot which is located to receive the lever portion when the lever portion is in the neutral position (with respect to forward and backward rotation) as the lever portion rotates outboard. A stop member fixed to the base stops the lever portion from rotating past the neutral outboard position. A sensor associated with the stop member produces a signal when the lever portion is in the neutral outboard position.

DETAILED DESCRIPTION

Figure 1:
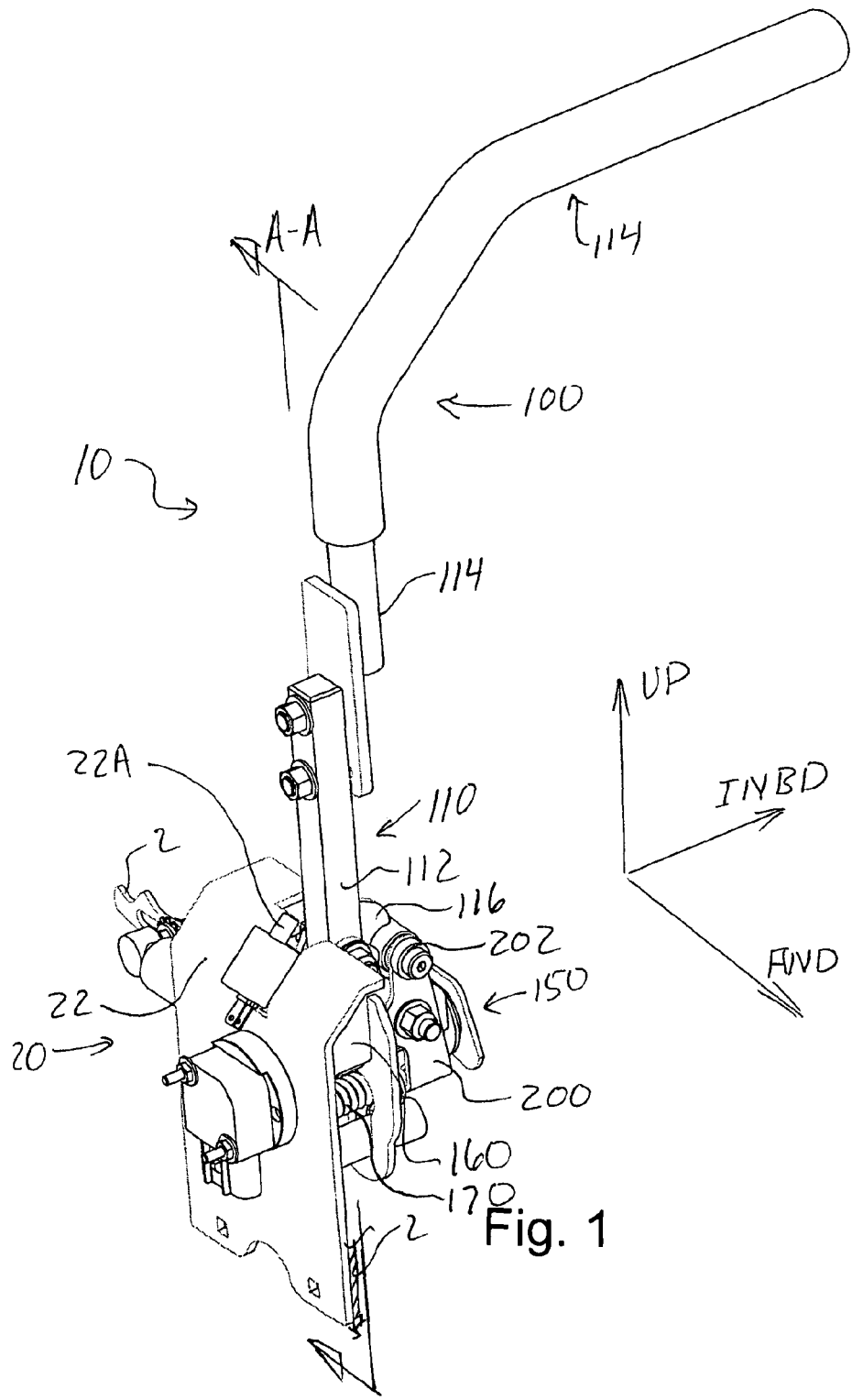
FIG. 1 is a first perspective view of the steering lever mechanism of the present invention.

Referring to the drawings, FIG. 1 provides a perspective view of a steering lever mechanism 10 which is mounted to a mower vehicle frame 2. Steering lever mechanism 10 generally includes a base 20 and a lever assembly 100. Base 20 further includes an outboard bracket 22 and an inboard bracket 24 (shown in FIG. 4) which are both fixed to a frame 2 of the mower vehicle.

As can be best seen in FIGS. 2-5, lever assembly 100 includes a lever portion 110 and a pivot assembly 150. Lever portion 110 includes a lower lever member 112 and a handle 114 which is fixed to the upper end of lower lever member 112. Handle 114 preferably includes padding 114A for operator comfort.

Figure 4:
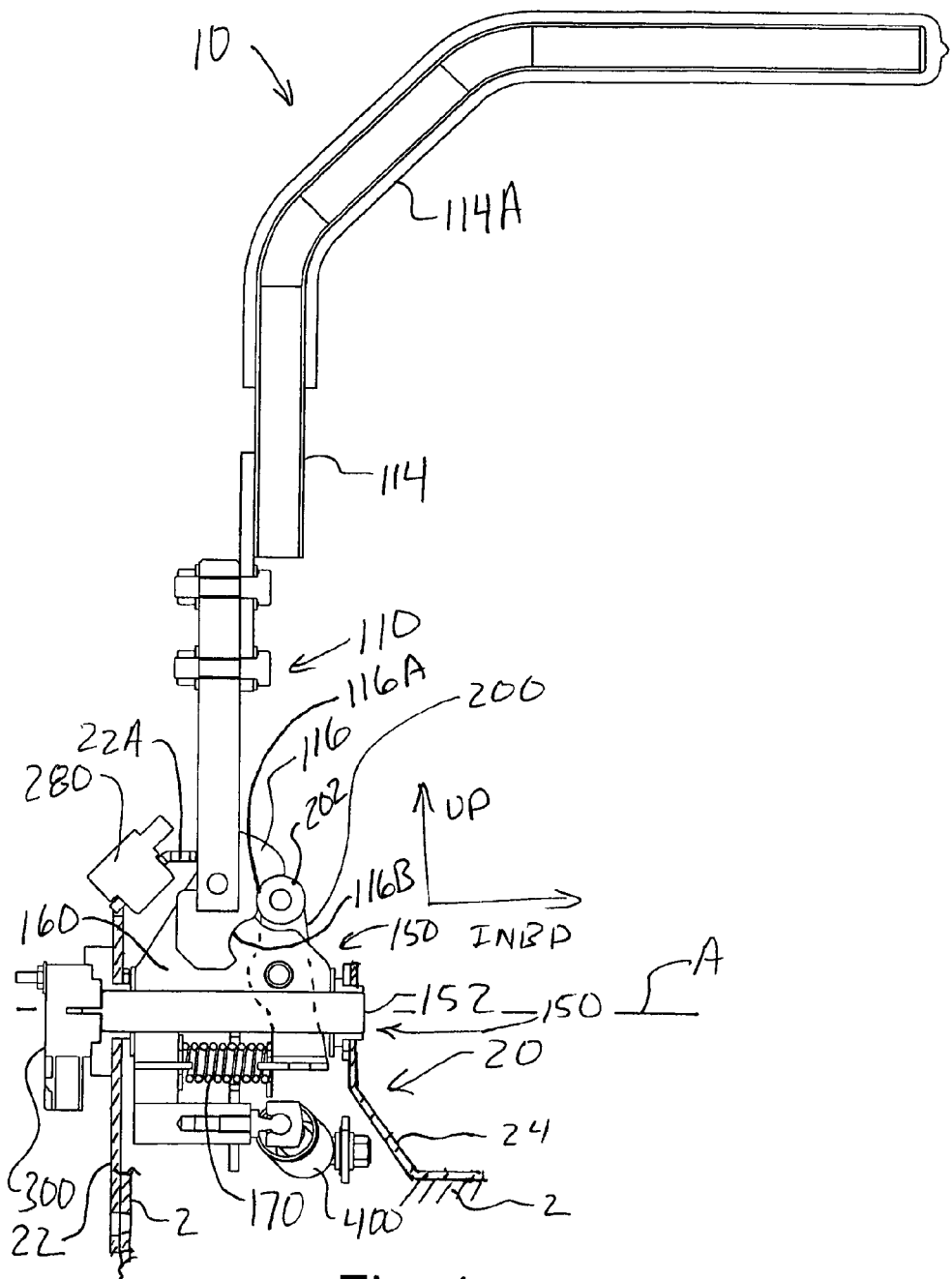
FIG. 4 is a sectional view of the steering lever mechanism of the present invention taken from plane A-A of FIG. 1 showing the lever assembly in the inboard position.
Figure 5:
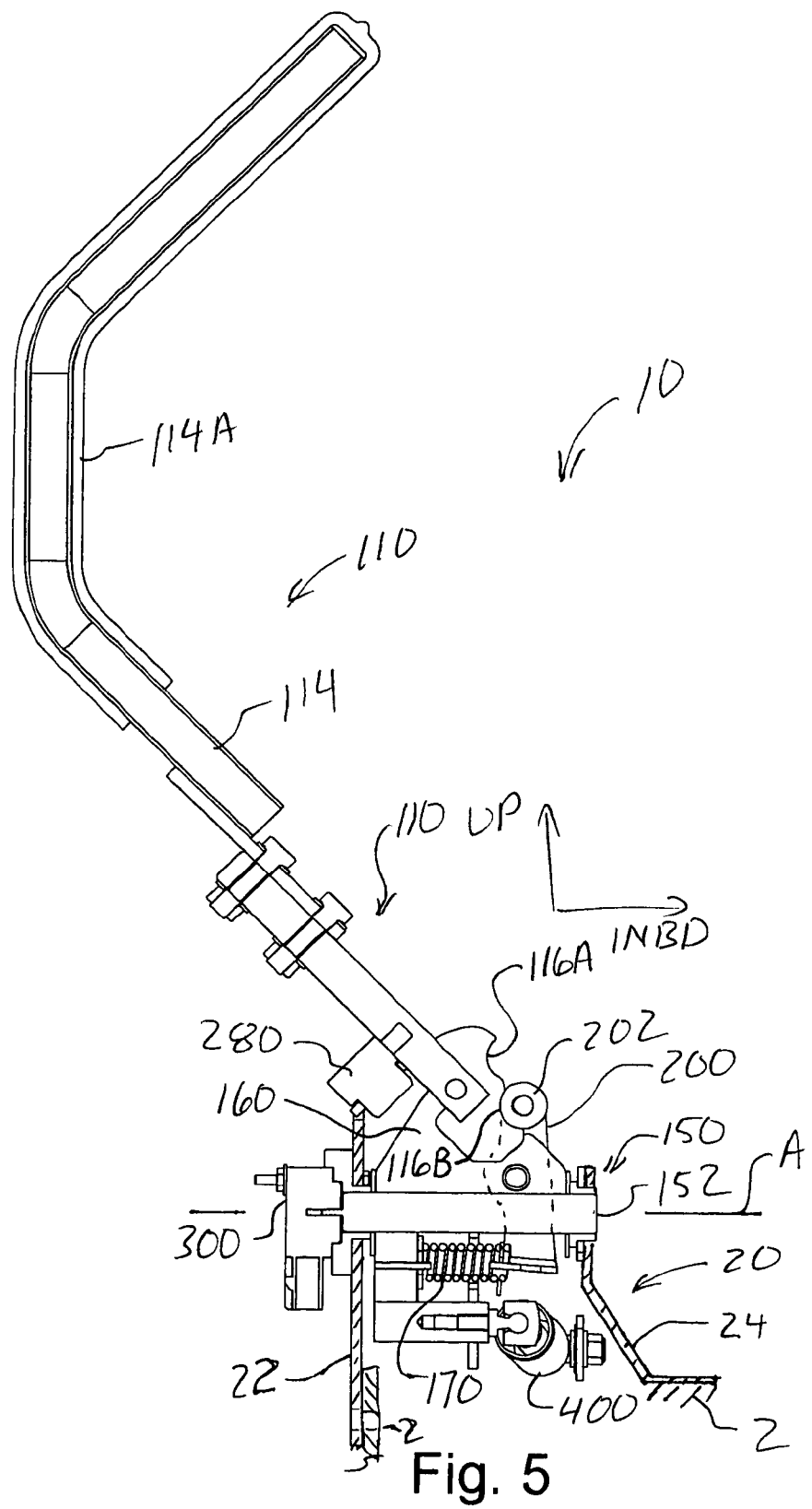
FIG. 5 is a sectional view of the steering lever mechanism of the present invention taken from plane A-A of FIG. 1 showing the lever assembly in the outboard position.

Pivot assembly 150 includes a pivot shaft 152 and a pivot bracket assembly 160. As is best shown in FIGS. 4 and 5, pivot shaft 152 is rotatably mounted to brackets 22 and 24 of base 20 for rotation about axis A which is generally a transverse axis parallel to the axis labeled INBD in the various figures. Pivot shaft 152 carries a pivot bracket assembly 160. As will be described in greater detail below, pivot bracket assembly 160 carries lever assembly 100

Figures 2, 3:
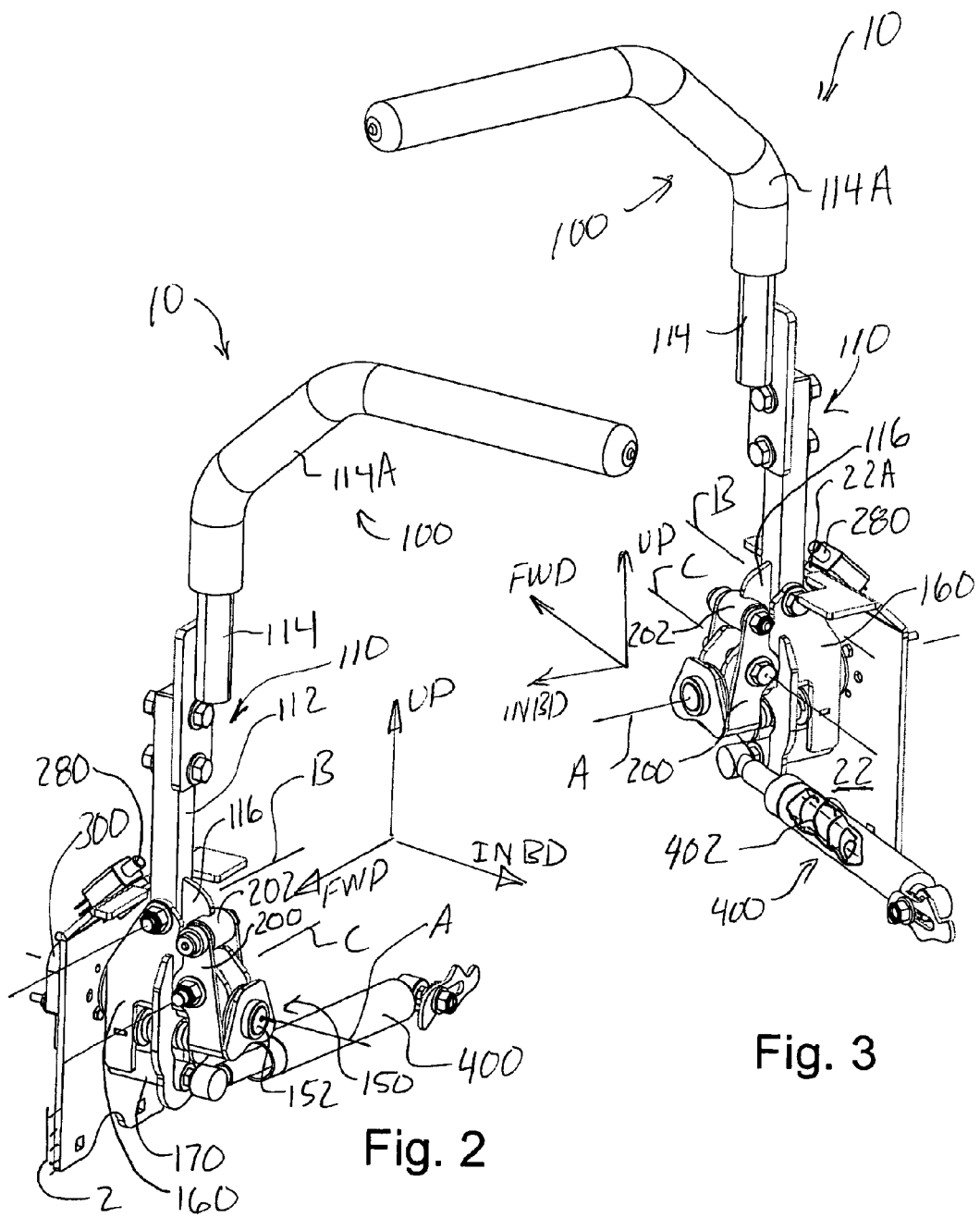
FIG. 2 is a second perspective view of the steering lever mechanism of the present invention.
FIG. 3 is a third perspective view of the steering lever mechanism of the present invention.

Lever assembly 100 is pivotably mounted to pivot bracket assembly 160 so that when permitted by a transverse slot 22A located near the upper end of outboard bracket 22, lever assembly 100 can rotate about axis B shown in FIG. 2 between an inboard position shown in FIG. 4 and an outboard position shown in FIG. 5. A cam follower arrangement is interposed between lever assembly 100 and pivot bracket assembly 160 so that lever assembly 100 is urged into one of the two above described positions as will be described in greater detail below.

As noted above, lower lever member 112 of lever assembly 100 is pivotably mounted to the upper end of pivot bracket assembly 160 for rotation about axis B shown in FIG. 2. As can best be seen in FIG. 4, a cam plate 116 is fixed to the lower end of lower lever member 112. Cam plate 116 includes a first recess 116A and a second recess 116B which are both adapted for receiving a cam roller 202. Cam roller 202 is rotatably mounted to a cam follower 200. Cam follower 200 is, in turn, pivotably mounted to pivot bracket assembly 160 for rotation about axis C shown in FIGS. 2 and 3. At its lower end below axis C and opposite from cam roller 202, cam follower 200 is spring biased by a compression spring 170 which urges cam roller 202 into one of first or second recess 116A or 116B of cam plate 116. Cam plate 116 is configured and located so that cam roller 202 tends to retain its position in either first or second recess 116A or 116B and does not move to the other recess unless an operator applies a force to lever assembly 100. Accordingly, lever assembly 100 tends to remain in the inboard position shown in FIG. 4 and when received by slot 22A will remain in the outboard position shown in FIG. 5 unless acted upon. An outboard lever position sensor 280 (shown in FIG. 4) mounted to outboard bracket 22 is adapted to detect lever assembly 100 when it is in the outboard position as shown in FIG. 5. Outboard lever position sensor 280 is preferably in communication with a parking break system which, upon receiving an outboard position signal, engages at least one parking break.

Lever assembly 100 is fixed to pivot bracket assembly 160 when considered from the perspective of rotation about a transverse axis. However, pivot bracket assembly 160 is mounted to brackets 22 and 24 by shaft 152 for rotation about a transverse axis A shown in FIGS. 2 and 3. Shaft 152 interfaces with a position measuring device 300 mounted on the outboard side of outboard bracket 22. Position measuring device 300 may be potentiometer which is well known to those skilled in the art or any other suitable device capable of measuring displacement or rotation. Position measuring device 300 provides signals to a drive control system (not shown) which in turn determines whether the drive wheel controlled by lever assembly 100 rotates in a reverse direction, a forward direction or is stationary as indicated by a neutral lever assembly position such that the forward position indicates forward rotation at a maximum forward speed and such that the rear position indicates reverse rotation at a maximum reverse speed and so on for lesser speeds of rotation as indicated by intermediate positions of the lever assembly 100 between the neutral position and either the forward or rear positions.

The rotation of lever assembly 100 and the rotation of pivot bracket assembly 160 about axis A is resisted by a dampener unit 400 which connects between the extreme lower end of pivot bracket assembly 160 and vehicle frame 2. In this example dampener unit 400 is a linear dampener which is adapted to resist the rotation of pivot bracket assembly 160 (and thus lever assembly 100) either in a forward or rear direction about axis A. In this example, dampener unit 400 preferably includes a compression spring 402 which is positioned within dampener unit 400 such that spring 402 biases lever assembly 100 away from the rear position and toward the neutral position. With this arrangement, the operator must apply constant pressure to cause the mower to move in reverse, yet, the operator merely moves lever assembly 100 to a forward position and holds lever assembly 100 in the selected forward position without applying constant pressure in order to cause the mower to move forward. In this example, dampener member 400 is pivotably connected to frame 2 at its distal end and pivotably connected at its proximate end to a cylindrical lug 170 which is fixed to the lower end of pivot bracket assembly 160. Cylindrical lug 170 is spaced away form the axis of rotation A of pivot bracket assembly 160 so that rotation of pivot bracket assembly 160 about axis A causes displacement of the proximate end of dampener member 400 relative to the fixed distal end of dampener member 400.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A steering lever mechanism for a vehicle, comprising:
   (a) a lever assembly including a pivot assembly and a lever portion, the lever portion pivotably mounted to the pivot assembly for rotation about a first axis between a first inboard position and a second outboard position,
   (b) at least one bracket mounted to the vehicle for rotatably mounting the pivot assembly of the lever assembly to the vehicle for rotation of the pivot assembly and the lever portion about a second axis between a rear position, an intermediate neutral position and a forward position
   (c) a position measuring device associated with the at least one bracket and a pivot assembly for measuring the position of the lever assembly, and,
   (d) a sensor associated with the at least one bracket for indicating if the lever assembly is in the second outboard position.

2. A steering lever mechanism for a zero turn mower, comprising:
   (a) a base fixed to the frame of a mower,
   (b) a pivot assembly including a pivot shaft rotatably mounted to the base for rotation about a generally transverse axis between a forward position, an intermediate neutral position and a rear position,
   (b) a position measuring device connecting between the base and the pivot shaft for measuring the position of the pivot shaft relative to a forward position, a neutral position and a rear position,
   (c) a mechanical resistance device connecting between pivot assembly and the frame of the mower for resisting rotation of the pivot assembly between the forward position and the rear position,
   (d) a lever portion pivotably mounted to the pivot assembly for rotation about a generally longitudinal axis between an inboard position and an outboard position,
   (e) a cam member fixed to the lever portion having a first recess and a second recess,
   (f) a spring biased cam follower pivotably mounted to the pivot assembly and adapted for being urged into one of first or second recesses of the cam member, the cam follower and the first recess and the second recess of the cam member arranged such that the cam follower engages the first recess when the lever portion is in an inboard position and such that the cam follower engages the second recess when the lever portion is in an outboard position and such that engagement of the cam follower with each recess occurs with sufficient pressure such that manual urging of the lever portion is required to move the lever portion between the inboard position and the outboard position.

3. The steering lever mechanism of claim 2, wherein;
the base includes at least one bracket having a slot which receives the lever portion when the lever portion is in the neutral outboard position so that the lever portion may be rotated to the outboard position when the lever portion is in the neutral position.

4. The steering lever mechanism of claim 2, wherein;
the base includes at least one bracket having a slot which receives the lever portion when the lever portion is in the neutral outboard position so that the lever portion may be rotated to the outboard position when the lever portion is in the neutral position,
and the base includes a sensor for detecting when the lever portion is the outboard position.

5. The steering lever mechanism of claim 2, wherein;
the mechanical resistance device connecting between pivot assembly and the frame of the mower further includes a spring for biasing the lever portion from the rear position to the neutral position.

\* \* \* \* \*